United States Patent
Abe et al.

(10) Patent No.: US 8,400,544 B2
(45) Date of Patent: Mar. 19, 2013

(54) SOLID-STATE IMAGING DEVICE AND CAMERA

(75) Inventors: Yutaka Abe, Osaka (JP); Masashi Murakami, Kyoto (JP); Rie Ryuzaki, Kyoto (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 12/508,193

(22) Filed: Jul. 23, 2009

(65) Prior Publication Data

US 2010/0020217 A1 Jan. 28, 2010

(30) Foreign Application Priority Data

Jul. 24, 2008 (JP) .................................. 2008-191484

(51) Int. Cl.
H04N 3/14 (2006.01)
(52) U.S. Cl. ...................................... 348/308; 348/300
(58) Field of Classification Search .............. 348/308, 348/294, 300, 301, 241, 248; 250/208.1
See application file for complete search history.

(56) References Cited

U.S. PATENT DOCUMENTS

| 7,141,775 B2 | 11/2006 | Koseki |
| 7,394,055 B2 | 7/2008 | Koseki |
| 7,432,493 B2 | 10/2008 | Koseki |
| 7,589,304 B2 * | 9/2009 | Koseki ..................... 250/208.1 |
| 7,791,660 B2 * | 9/2010 | Yoshida et al. ............... 348/294 |
| 8,045,032 B2 * | 10/2011 | Muroshima et al. .......... 348/308 |
| 2002/0001038 A1 | 1/2002 | Lee |
| 2005/0194520 A1 | 9/2005 | Koseki |
| 2006/0071252 A1 | 4/2006 | Kondo |
| 2007/0069112 A1 | 3/2007 | Koseki |
| 2007/0069113 A1 | 3/2007 | Koseki |
| 2007/0247535 A1 | 10/2007 | Yoshida et al. |
| 2008/0067326 A1 | 3/2008 | Koseki |
| 2008/0067327 A1 | 3/2008 | Koseki |
| 2008/0170143 A1 | 7/2008 | Yoshida |
| 2009/0014824 A1 | 1/2009 | Sakoh et al. |
| 2009/0033782 A1 * | 2/2009 | Muroshima et al. .......... 348/308 |
| 2009/0066793 A1 | 3/2009 | Takeda |
| 2009/0160993 A1 | 6/2009 | Kato et al. |
| 2009/0167586 A1 | 7/2009 | Shimomura et al. |

FOREIGN PATENT DOCUMENTS

JP 2005-252529 9/2005

OTHER PUBLICATIONS

English language Abstract of JP 2005-252529, Sep. 15, 2005.

* cited by examiner

*Primary Examiner* — Chieh M Fan
*Assistant Examiner* — Ahmed A Berhan
(74) *Attorney, Agent, or Firm* — Greenblum & Bernstein, P.L.C.

(57) ABSTRACT

The solid-state imaging device having pixels that are arranged in rows and columns and convert optical signals to electric signals to output the electric signals as voltage signals includes column signal lines each provided for a corresponding one of the columns and transmitting, in the direction of the columns, voltage signals outputted from the pixels, current sources each provided for and connected to a corresponding one of the column signal lines, column amplification circuits each provided for a corresponding one of the column signal lines and amplifying the voltage signals transmitted through the column signal lines, a current-source ground potential supply line supplying the current sources with ground potential, and a column amplification circuit ground potential supply line supplying the column amplification circuits with ground potential. The current-source ground potential supply line and the column amplification circuit ground potential supply line are interconnected at positions corresponding to the columns.

16 Claims, 13 Drawing Sheets

SOLID-STATE IMAGING DEVICE AND CAMERA

BACKGROUND OF THE INVENTION (1) Field of the Invention

The present invention relates to a solid-state imaging device.

(2) Description of the Related Art

In recent years, MOS solid-state imaging devices receive more and more attention as imaging devices which take the place of CCD solid-state imaging devices. This is because MOS solid-state imaging devices have many advantages. One of the advantages is that MOS solid-state imaging devices can be manufactured through a CMOS process using existing facilities, and thus stably supplied for the market. Another is that MOS solid-state imaging devices can be increased both in speed and in resolution owing to the capability for providing high-speed readout.

However, since a MOS solid-state imaging device is provided with column amplification circuits which are as many as the number of pixel columns and arranged in the direction of pixel rows, power supplies and ground lines in the MOS solid-state imaging device have an impedance common among all of the column amplification circuits. Because of this, a change in a current in one of the column amplification circuits causes fluctuation in power-supply potential and ground potential, resulting in an effect on all of the column amplification circuits.

Thus, high-intensity incident light on a part of an array of pixels changes a current in the column amplification circuit that amplifies signals from the pixels, and the change in the current affects currents in all of the column amplification circuits. This causes a difference in an output signal between a reset period and an amplification period even from a column amplification circuit that amplifies a signal from a pixel having no incident light. This leads to poor imaging of a white or black streak (generally referred to as streaking) on the sides of a highlight in an output image.

For such poor imaging, Patent Reference 1 discloses a technique for reducing streaking by keeping a current in a column amplification circuit constant using a limiter installed in an outputting unit of a column amplification circuit. The limiter causes a current-source transistor, which is a current source of a source ground amplification circuit, to operate in a saturation region regardless of a signal from a pixel.

[Patent Reference 1] Japanese Unexamined Patent Publication No. 2005-252529

SUMMARY OF THE INVENTION

However, streaking may not be reduced even using the technique described in Patent Reference 1 because operation of a current-source transistor in a linear region is not an only cause of streaking.

The present invention, conceived to address this problem, has an object of providing a solid-state imaging device and a camera that effectively reduce streaking.

In order to achieve the above-mentioned object, the solid-state imaging device according to an aspect of the present invention, which has a plurality of pixels that are arranged in rows and columns and convert optical signals into electric signals to output the electric signals as voltage signals, includes: column signal lines each provided for a corresponding one of the columns of the pixels, the column signal lines transmitting, in a direction of the columns, the voltage signals outputted from the pixels; current sources each provided for and connected to a corresponding one of the column signal lines; column amplification circuits each provided for a corresponding one of the column signal lines, the column amplification circuits amplifying the voltage signals transmitted through the column signal lines; a first ground line supplying the current sources with ground potential; and a second ground line supplying the column amplification circuits with ground potential, wherein the first and second ground lines are interconnected at positions each corresponding to a corresponding one of the columns of the pixels.

In a MOS solid-state imaging device according to the present invention, the first ground line supplying the current sources with ground potential and the second ground line supplying the column amplification circuits with ground potential are common. Accordingly, even when the ground potential of either the current sources or the column amplification circuits decreases due to fluctuation in current in a signal-readout path, the ground potential of both the current sources and the column amplification circuits commonly decreases and output variations of the column amplification circuits are offset. Thus, streaking caused by the fluctuation in current in the signal-readout path is effectively reduced.

Furthermore, the solid-state imaging device may further includes holding circuits each provided for a corresponding one of the column amplifying circuits, the holding circuits temporally holding the amplified voltage signals outputted from the column amplifying circuits. In this case, the solid-state imaging device preferably includes column AD conversion circuits each provided for a corresponding one of the holding circuits, the column AD conversion circuits converting the voltage signals held in said holding circuits into digital signals.

This makes it possible that operation of the amplification and reset of signals from the pixels in the circuitry up to the column amplification circuit and operation of the AD conversion in the circuitry downstream of the column amplification circuit are simultaneously performed. Furthermore, this makes it possible that output of the column amplification circuit is read out after AD conversion for each of the pixel columns. Thus, the frame rate and the S/N ratio of an output image are increased.

With the common lines which supply the current sources and the column amplification circuits with ground potential, the present invention reduces streaking in output images by offsetting output variations of the column amplification circuits even when ground potential of either the current sources or the column amplification circuits decreases.

FURTHER INFORMATION ABOUT TECHNICAL BACKGROUND TO THIS APPLICATION

The disclosure of Japanese Patent Application No. 2008-191484 filed on Jul. 24, 2008 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENTS

First Embodiment

A solid-state imaging device according to the first embodiment of the present invention is described below with reference to figures.

Figure 1:
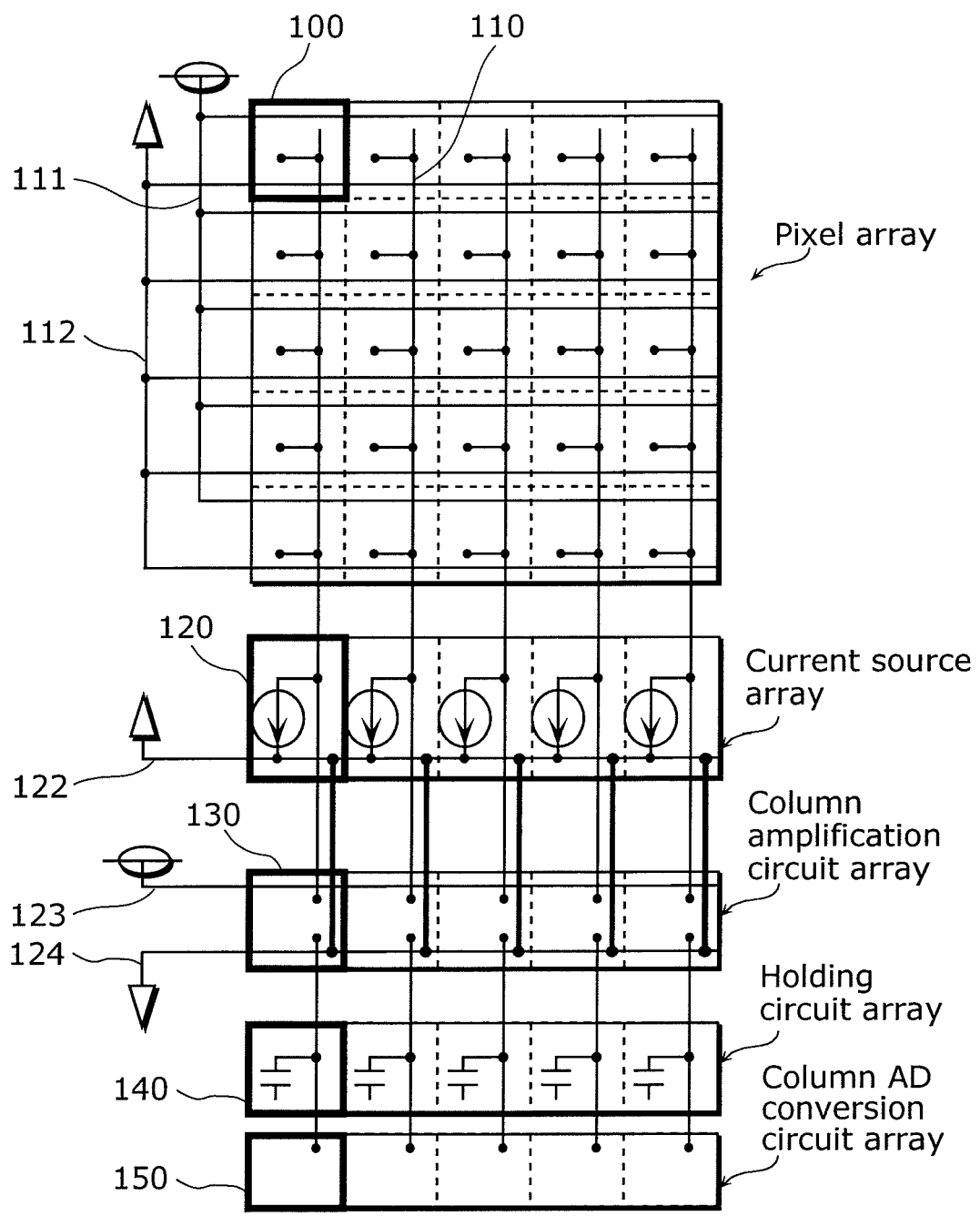
FIG. 1 is a schematic diagram showing an overall configuration of a solid-state imaging device according to the first embodiment of the present invention.

FIG. 1 is a schematic diagram showing an overall configuration of a solid-state imaging device according to the first embodiment.

As shown in FIG. 1, the solid-state imaging device according to the first embodiment includes a plurality of pixels 100, column signal lines 110, current sources 120, column amplification circuits 130, pixel power-supply potential supply lines 111 and 112, a current-source ground potential supply line 122, a column amplification circuit power-supply potential supply line 123, and a column amplification circuit ground potential supply line 124. The plurality of pixels 100 are arranged in rows and columns and convert optical signals to electric signals to output the electric signals as voltage signals. The column signal lines 110 are each provided for a corresponding one of columns of the pixels 100 (pixel columns) and transmit the voltage signals from the pixels 100 in the direction of the columns. The current sources 120 are each provided for and connected to a corresponding one of the column signal lines 110 so as to cause the column signal lines 110 to read out the voltage signals. The column amplification circuits 130 are each provided for a corresponding one of the column signal lines 110 and amplify the voltage signals transmitted through the column signal lines 110. The pixel power-supply potential supply lines 111 supply the plurality of pixels 100 with power-supply potential. The pixel ground potential supply lines 112 supply the plurality of pixels 100 with ground potential. The current-source ground potential supply line 122 supplies the current sources 120 with ground potential. The column amplification circuit power-supply potential supply line 123 supplies the column amplification circuits 130 with power-supply potential. The column amplification circuit ground potential supply line 124 supplies the column amplification circuits 130 with ground potential. The current-source ground potential supply line 122 is an example of a first ground line according to the present invention, and the column amplification circuit ground potential supply line 124 is an example of a second ground line according to the present invention.

The pixel power-supply potential supply lines 111 and the pixel ground potential supply lines 112 are connected to a pixel array composed of the plurality of pixels 100. Similarly, the current-source ground potential supply line 122 is connected to a current-source array composed of the current sources 120. The column amplification circuit power-supply potential supply line 123 and the column amplification circuit ground potential supply line 124 are connected to a column amplification circuit array composed of the column amplification circuits 130. Generally, because of a layout constraint, each of these power-supply potential supply lines and the ground potential supply lines are commonly connected to the pixels 100, the current sources 120, or the column amplification circuit 130.

The solid-state imaging device according to the present invention further includes holding circuits 140 that are each provided for a corresponding one of the column amplification circuits 130 (or a corresponding one of the column signal lines 110) and temporarily hold the amplified voltage signals outputted from the column amplification circuits 130 and column AD conversion circuits 150 that are each provided for a corresponding one of the holding circuits 140 (or a corresponding one of the column signal lines 110) and convert the voltage signals held in the holding circuits 140 into digital signals for the respective pixel columns.

In this case, the current-source ground potential supply line 122 and the column amplification circuit ground potential supply line 124 are interconnected at positions each corresponding to a corresponding one of the pixel columns.

Figure 2:
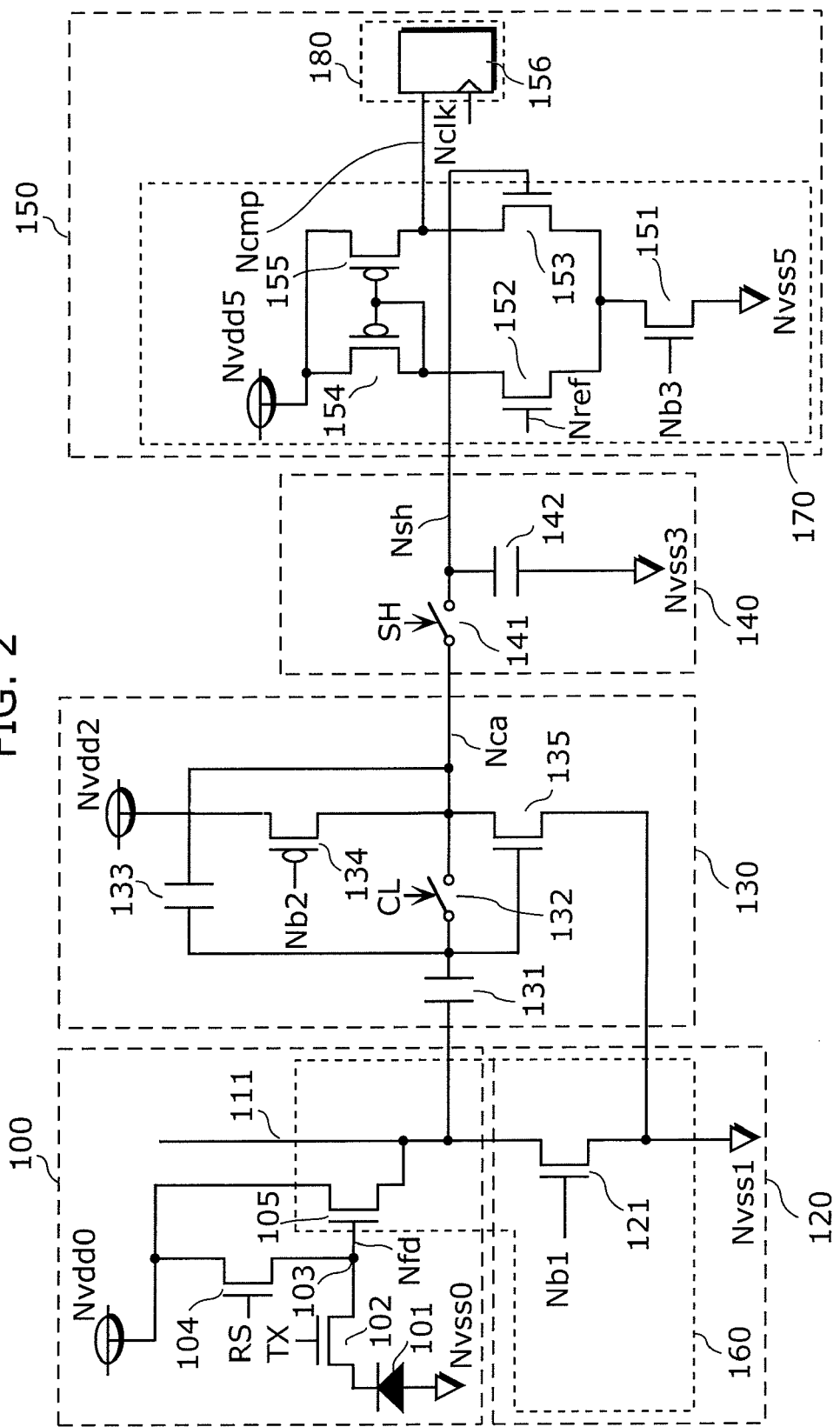
FIG. 2 is a diagram showing a configuration of the solid-state imaging device according to the first embodiment of the present invention in detail.

FIG. 2 is a diagram showing a configuration of the solid-state imaging device according to the first embodiment in detail. Specifically, FIG. 2 shows a circuit included in one of the pixels 100 and a circuit that processes a signal from the pixel 100.

The pixel 100 includes a photodiode 101, three transistors of a transfer transistor 102, a reset transistor 104, and an amplification transistor 105, and a floating diffusion unit 103.

The photodiode 101 performs photoelectric conversion on incident light and accumulates signal charge resulting from the photoelectric conversion. The transfer transistor 102, which is provided between the photodiode 101 and the floating diffusion unit 103, reads out the signal charge accumulated in the photodiode 101 and transfers the signal charge to the floating diffusion unit 103. The floating diffusion unit 103 temporarily accumulates the signal charge transferred from the photodiode 101. The amplification transistor 105 amplifies the signal charge accumulated in the floating diffusion unit 103. The amplification transistor 105 then outputs voltage signals according to potential of the floating diffusion unit 103 (potential at the gate node Nfd of the amplification transistor 105). The reset transistor 104 resets the signal charge accumulated in the floating diffusion unit 103 to initialize the potential of the floating diffusion unit 103.

The solid-state imaging device according to the first embodiment may include a select transistor that selects a row of the pixels 100 (a pixel row) from which voltage signals are read out. The solid-state imaging device may have a configuration in which the transfer transistor 102 is not provided and the signal charge accumulated in the photodiode 101 are directly amplified by the amplification transistor 105 and reset by the reset transistor 104.

The gate of the transfer transistor 102 receives a control pulse TX which controls on and off of the transfer transistor 102. The gate of the reset transistor 104 receives a control pulse RS which controls on and off of the reset transistor 104.

A voltage value Vfd of the gate potential of the amplification transistor 105 (potential of the floating diffusion unit 103) is read out into the column signal line 110 through a source follower circuit 160 that includes the amplification transistor 105 and a constant current supply transistor 121 of the current source 120. The constant current-source transistor 121 receives a control pulse Nb1 which controls on and off of the constant current supply transistor 121.

The column amplification circuit 130 includes two capacitors of an input capacitor 131 and a feedback capacitor 133, two transistors of a constant current-source transistor 134 and an amplification transistor 135, and a clamp switch 132. The constant current supply transistor 134, which operates as a current source, provides a column amplification circuit 130 with a constant current. The clamp switch 132 receives a control pulse CL which controls on and off of the clamp switch 132. When the clamp switch 132 is turned on, the gate and the drain of the amplification transistor 135 are shorted to reset the column amplification circuit 130. The input capacitor 131 and the feedback capacitor 133 determine an amplification factor G (G is a positive value) of the column amplification circuit 130. The amplification factor G of the column amplification circuit 130 is determined on the basis of a capacitor ratio of the input capacitor 131 and the feedback capacitor 133. The constant current-source transistor 134 receives a control pulse Nb2 which controls on and off of the constant current supply transistor 134.

The holding circuit 140 includes a sample hold switch 141 and a holding capacitor 142. The holding circuit 140 causes the holding capacitor 142 to hold an output from the column amplification circuit 130. This allows circuitry up to the column amplification circuit 130 and circuitry downstream of the column amplification circuit 130 to operate simultaneously, thereby achieving fast readout of signals from the pixels 100. The sample hold switch 141 receives a control pulse SH which controls on and off of the sample hold switch 141.

The column AD conversion circuit 150, which includes a differential comparison circuit 170 and a counter circuit 180, enables fast readout of signals from the pixels 100 and a high S/N ratio by converting the signals from the pixels 100 into digital signals for the respective pixel columns and outputting the resulting digital signals.

The differential comparison circuit 170 includes a constant current-source transistor 151, and transistors 152, 153, 154, and 155. The counter circuit 180 includes a flip-flop 156. The constant current supply transistor 151 receives a control pulse Nb3 which controls on and off of the constant current-source transistor 151. The flip-flop 156 receives a clock signal Nclk.

Figure 3:
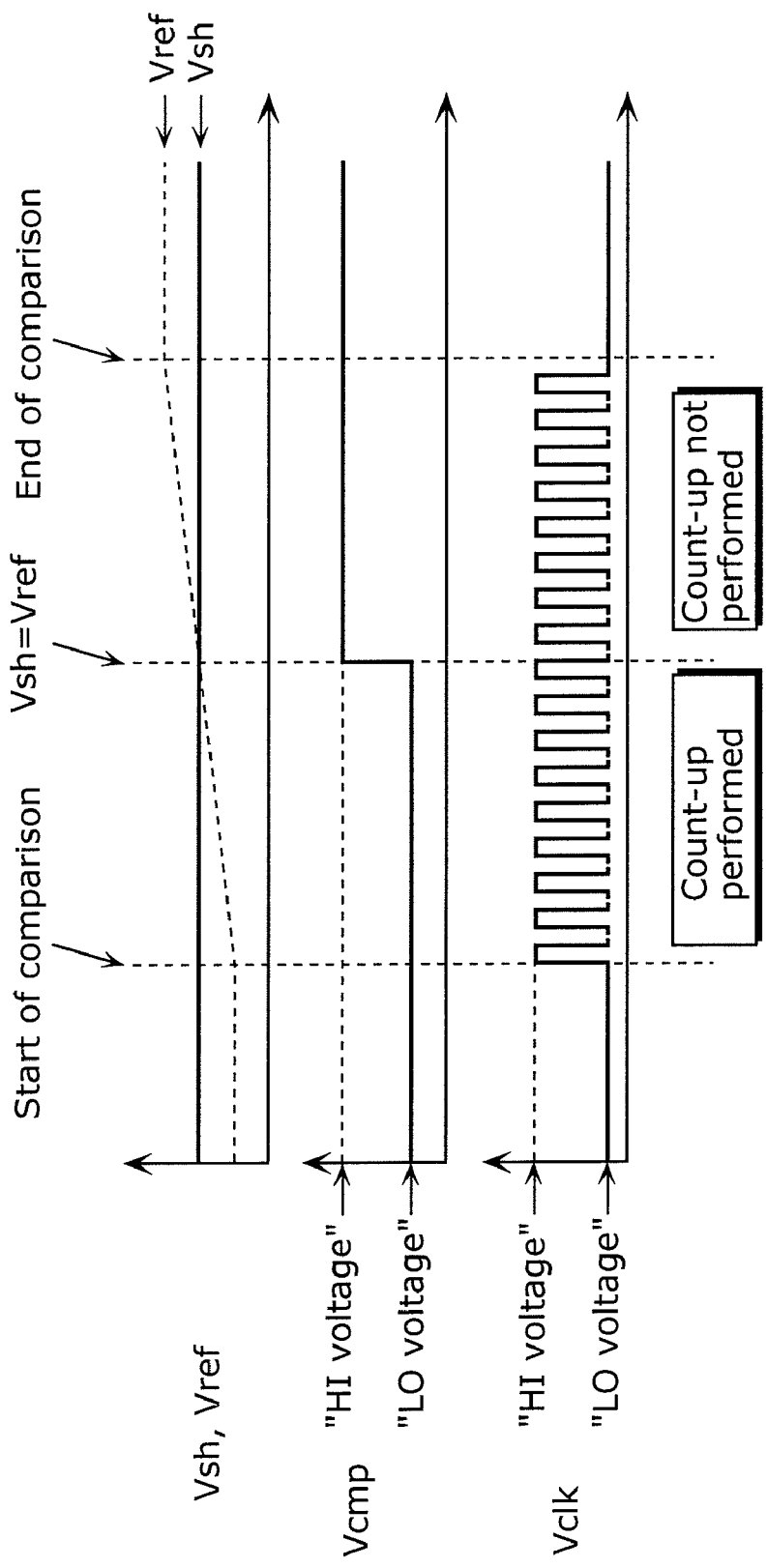
FIG. 3 is a timing chart showing an operation (a driving method) of the column AD conversion circuit 150 of the solid-state imaging device according to the first embodiment of the present invention.

FIG. 3 is a timing chart showing an operation (a driving method) of the column AD conversion circuit 150 installed in the solid-state imaging device according to the first embodiment. In FIG. 3, the horizontal axes indicate time, and the vertical axes indicate voltage values.

The differential comparison circuit 170 compares magnitudes of a voltage Vref at the gate node Nref of the transistor 152 and a voltage value at the gate of the transistor 153, that is, a voltage value Vsh at the output node Nsh of the holding circuit 140. When the voltage value Vref at the gate node Nref is greater than the voltage value Vsh at the output node Nsh, a voltage value Vcmp at the output node Ncmp of the differential comparison circuit 170 is "HI voltage". When the voltage value Vref at the gate node Nref is smaller than the voltage value Vsh at the output node Nsh, a voltage value Vcmp at the output node Ncmp of the differential comparison circuit 170 is "LO voltage". In the case where the voltage value Vref at the gate node Nref is increased with time, the voltage value Vcmp at the output node Ncmp keeps "LO voltage" until the voltage value Vref at the gate node Nref becomes equal to the voltage value Vsh at the output node Nsh, and then changes to "HI voltage" after the voltage value Vref at the gate node Nref becomes equal to the voltage value Vsh at the output node Nsh.

The counter circuit 180 is controlled with the clock signal Vclk, which regularly switches between the "HI voltage" and the "LO voltage", and the voltage value Vcmp at an output node Ncmp of the differential comparison circuit 170. The counter circuit 180 counts up by one when the voltage value Vcmp at the output node Ncmp is "LO voltage" and the clock signal Vclk switches from the "LO voltage" to the "HI voltage".

The period of time when the clock signal Vclk keeps switching between the "HI voltage" and the "LO voltage" is referred to as a comparison period. The counter circuit 180 outputs, as a digitally converted value of a voltage signal outputted from the column amplification circuit 130, the number of times of switching of the clock signal Vclk from the "HI voltage" to the "LO voltage" until the voltage value increasing during the comparison period Vref becomes equal to the voltage value Vsh.

Although a circuit described above has a configuration in which the differential comparison circuit 170 and the counter circuit 180 are used in a column AD conversion circuit 150 installed in the solid-state imaging device according to the first embodiment and FIG. 3 illustrates a driving method of the solid-state imaging device, the voltage signal from the pixel 100 may be converted into a digital signal in a configuration or a driving method other than above.

Furthermore, although the transfer transistor 102, the reset transistor 104, and the amplification transistor 105 of the pixel 100 in the solid-state imaging device according to the first embodiment are all NMOS transistors, all of these transistors may be PMOS transistors. In this case, the power-supply potential and the ground potential are interchanged, the constant current supply transistor 134 and the amplification transistor 135, which are PMOS transistors, are replaced with NMOS transistors. Control signal voltages at the gates of these transistors swap their roles.

An operation (a driving method) of the solid-state imaging device according to the first embodiment is hereinafter described.

Figure 4:
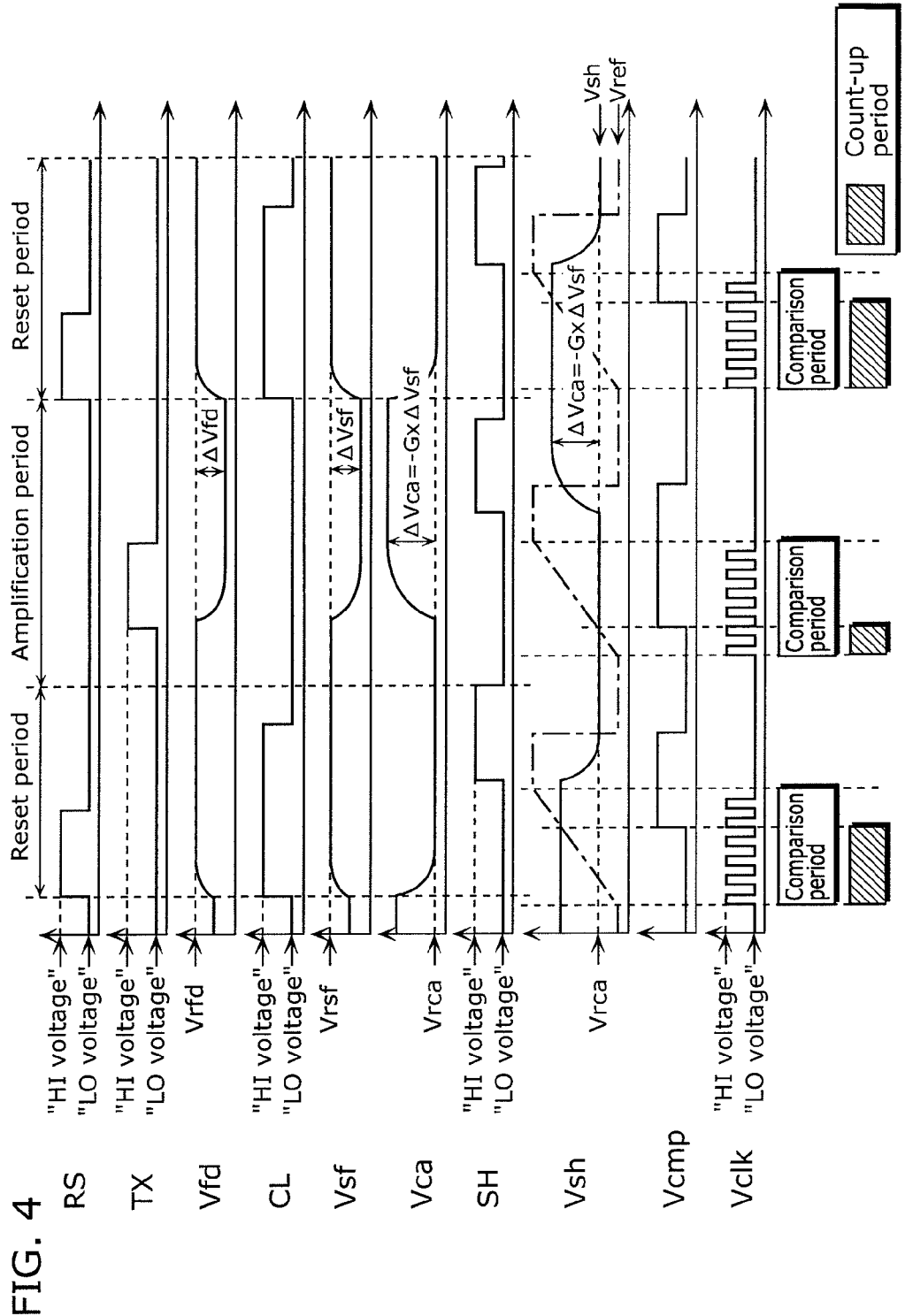
FIG. 4 is a timing chart showing an operation (a driving method) of the solid-state imaging device according to the first embodiment of the present invention.

FIG. 4 is a timing chart showing an operation (a method of driving) of the solid-state imaging device according to the first embodiment. In FIG. 4, the horizontal axes indicate time, and the vertical axes indicate voltage values.

First, a control pulse RS of the reset transistor of the pixel 100 is set to the "HI voltage". This resets the floating diffusion unit 103, and the voltage value Vfd at the gate node Nfd of the amplification transistor 105 is set to a reset voltage value Vrfd of the floating diffusion unit 103. The voltage according to the potential of the floating diffusion unit 103 is read out through the source follower circuit 160, and the voltage value of the column signal line 110 is set to Vrsf.

Next, the control pulse CL of the clamp switch 132 of the column amplification circuit 130 is set to the "HI voltage". This resets the column amplification circuit 130, and the voltage value Vca at the output node Nca of the column amplification circuit 130 is set to a reset voltage value Vrca of the column amplification circuit 130. The period of time when the clamp switch 132 is on and the column amplification circuit 130 is reset is referred to as a reset period.

Next, the control pulses RS and CS are sequentially set to the "LO voltage", and the control pulse of the sample hold switch 141 is set to the "HI voltage". This sets the voltage value Vsh at the output node Nsh of the holding circuit 140 to Vrca. The voltage value Vsh at the output node Vsh is maintained at Vrca even after the control pulse SH is set to the "LO voltage".

Next, the control pulse TX of the transfer transistor 102 of the pixel 100 is set to the "HI voltage". This causes the signal charge accumulated in the photodiode 101 to be read out into the floating diffusion unit 103, and the voltage value Vfd at the gate node Nfd decreases from the voltage Vrfd by a ΔVfd that is according to the charge amount accumulated in the photodiode 101. As with the voltage value Vfd at the gate node Nfd, the voltage value Vsf of the column signal line 110 also decreases from the voltage value Vrsf by a ΔVsf that is according to the charge amount accumulated in the photodiode 101.

At this time, because the column amplification circuit 130 functions as an inverting amplifier with an amplification factor of −G, the voltage value Vca at the output node Nca of the column amplification circuit 130 increases from the reset voltage Vrca by G×ΔVsf. In other words, the voltage value Vca is Vrca+G×ΔVsf. The period of time when the clamp switch 132 is off and the column amplification circuit is performing amplification is referred to as an amplification period.

Next, the control pulse SH is set to "HI voltage". This causes the voltage value Vsh at the output node Nsh of the holding circuit 140 to increase from Vrca by G×ΔVsf to a value of Vrca+G×ΔVsf. Even after the control pulse SH is set to the "LO voltage", the voltage value Vsh at the output node Vsh is maintained at the value to which the voltage value Vsh has increased from Vrca by G×ΔVsf. When the control pulses RS and CL are set to "HI voltage", the pixel 100 and the column amplification circuit 130 are reset again, and then a signal is read out from another pixel 100. On the other hand, when the control pulse SH is "LO voltage", the AD conversion of output in the amplification period performed in the circuitry downstream of the column amplification circuit 130 and the resetting for reading out an signal from another pixel 100 is performed in parallel. This speeds up readout.

Next, the column AD conversion circuit 150 converts the voltage value Vsh at the output node Nsh of the holding circuit 140 into a digital value.

At this time, the digital value converted from Vrca can be obtained by performing the AD conversion shown in FIG. 3 while the voltage value Vsh at the output node Nsh is maintained at Vrca. Similarly, a digital value converted from the value of Vrca+G×ΔVsf can be obtained by performing the AD conversion shown in FIG. 3 while the voltage value Vsh at the output node Nsh is maintained at the value of Vrca+G×ΔVsf. Then, a digitally converted value of G×ΔVsf, which is a difference in the voltage value Vca at the output node Nca of the column amplification circuit 130, can be obtained by calculating a difference between the two digitally converted values obtained by the AD conversions described above.

Although, Vrfd, Vrsf, and Vrca varies among the pixels 100 or pixel columns, the difference G×ΔVsf, which is obtained by the operation above, in the voltage value Nca at the output node of the column amplification circuit 130 is made free from effects of such variations. The amplification factor of the column amplification circuit 130 is determined according to the capacitor ratio. This makes designing of the column amplification circuit 130 easier and eliminates variations among the pixel columns. The column amplification circuit 130 usually needs to be laid out so that each column has a width of a few micrometers. Use of a source ground amplification circuit having capacitance feedback of a simple configuration may make layout area necessary for the column amplification circuit 130 relatively small.

For the solid-state imaging device according to the first embodiment, the voltage signals outputted from the plurality of column amplification circuits 130 are converted into a digital signal for each of the columns, and then read out. This speeds up readout.

Furthermore, for the solid-state imaging device according to the first embodiment, noises are reduced by narrowing the bandwidth of the column amplification circuit 130, and the random noises due to analog signal processing are also reduced. This achieves a high S/N ratio.

For the operation (the driving method) of the solid-state imaging device according to the first embodiment, the control pulses RS and CL are not necessarily set to the "HI voltage" at the same time, and the control pulse CL may be set to the "LO voltage" after the control pulse SH is set to the "LO voltage".

How the streaking in output images (poor imaging) is reduced using the solid-state imaging device according to the first embodiment and the driving method thereof is hereinafter described.

Figure 5:
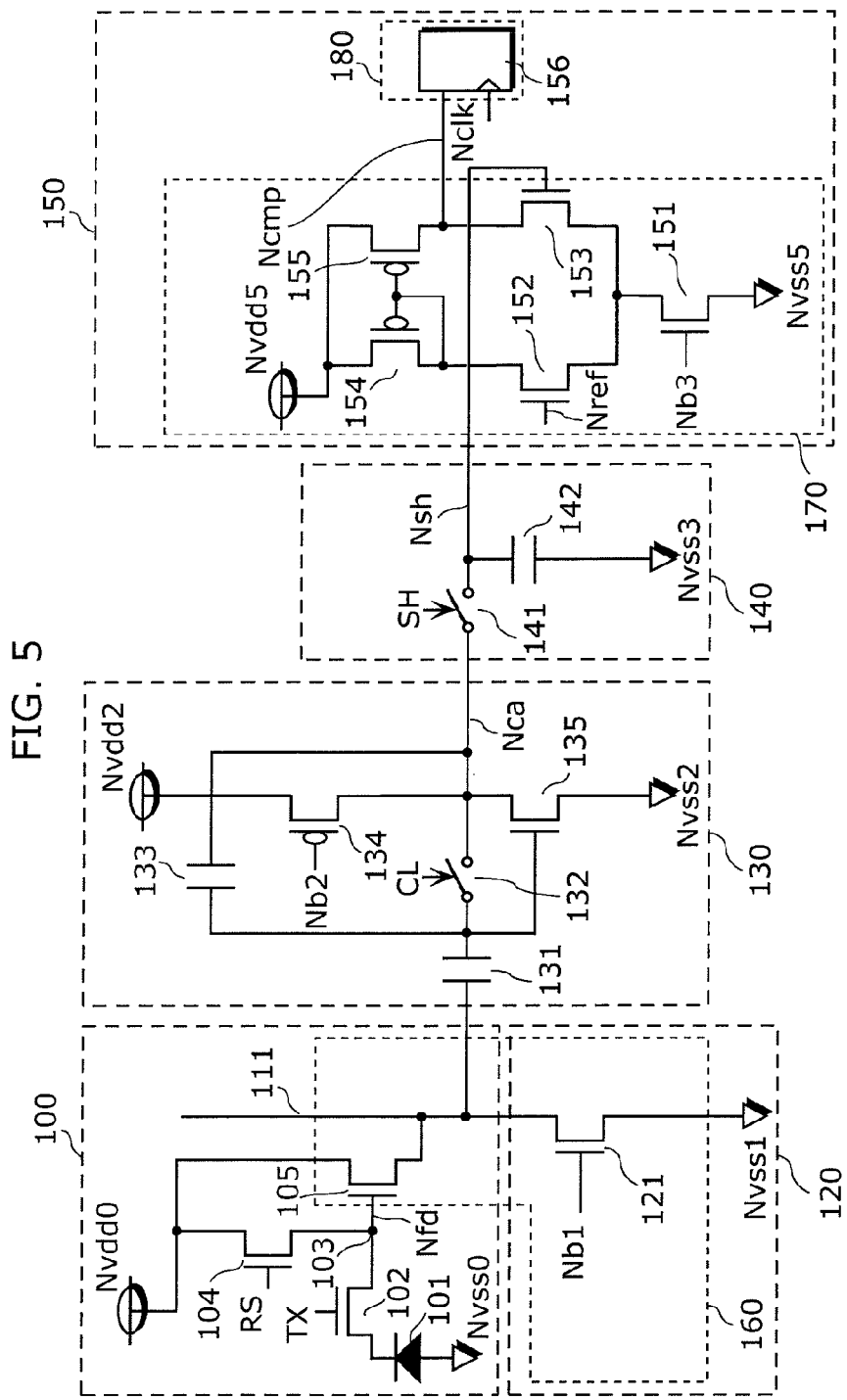
FIG. 5 is a diagram showing a configuration of a conventional solid-state imaging device in detail.

FIG. 5 is a diagram showing a configuration of a conventional solid-state device in detail. Specifically, FIG. 5 is a diagram showing a configuration of a solid-state imaging device (a reference device) that is different from the device configuration according to the first embodiment (the device configuration shown in FIGS. 1 and 2) in the point that the current source 120 (the source follower circuit 160) and the column amplification circuit 130 device do not share a ground node.

First, here is a comparison of the amount of streaking between the solid-state imaging device according to the first embodiment and the solid-state imaging device shown in FIG. 5.

In the amplification period in the driving method of the solid-state imaging device shown in FIG. 5, charging of the holding capacitor 142 starts when the control pulse SH is set to the "HI voltage". This charging uses a part of the current supplied through the power-supply potential supply line of the column amplification circuit 130; thus the amount of the current flowing the column amplification circuit 130 decreases, and ground potential Vss2 at the ground node Nvss2 of the column amplification circuit 130 decreases. The voltage value Vsca1 at the output node Nca of the column amplification circuit 130 is expressed in EQ. (1) below when the pixel 100 is receiving no incident light, where the amount of the decrease is ΔVss2:

$$Vsca1 = Vrca - (1+G) \times \Delta Vss2 \qquad \text{EQ. (1)}.$$

In this case, the voltage value Vca at the output node Nca of the column amplification circuit 130 varies between the reset period and the amplification period in spite that the pixel 100 is receiving no incident light. This variation is referred to as an output variation amount. An output variation amount Vstr1 of the device shown in FIG. 5 is expressed in EQ. (2) below:

$$Vstr1 = -(1+G) \times \Delta Vss2 \qquad \text{EQ. (2).}$$

On the other hand, for the solid-state device according to the first embodiment, the ground potential of the source follower circuit 160 also decreases by ΔVss2 when the ground potential of the column amplification circuit 130 decreases by ΔVss2. Thus, when the pixel 100 is receiving no incident light, a voltage value Vsca2 at the output node Nca is expressed in EQ. (3) below:

$$Vsca2 = Vrca - (1+G-G\times\alpha) \times \Delta Vss2 \qquad \text{EQ. (3).}$$

An output variation amount Vstr2 is expressed in EQ. (4) below:

$$Vstr2 = -(1 + G - G \times a) \times \Delta Vss2, \qquad (4)$$

where

[Math. 1]

$$\alpha = \sqrt{\frac{\beta_2}{\beta_1}},$$

[Math. 2]

$$\beta_1 = \frac{\mu_1 \times Cox_1 \times W_1}{L_1}$$

(μ1 indicates the carrier mobility of the amplification transistor 105; Cox1 indicates the gate capacity per unit area of the amplification transistor 105; W1 indicates the gate width of the amplification transistor 105; and L1 indicates the gate length of the amplification transistor 105.), and

[Math. 3]

$$\beta_2 = \frac{\mu_2 \times Cox_2 \times W_2}{L_2}$$

(μ2 indicates the carrier mobility of the constant current-source transistor 121; Cox2 indicates the gate capacity per unit area of the constant current supply transistor 121; W2 indicates the gate width of the constant current-source transistor 121; and L2 indicates the gate length of the constant current supply transistor 121.).

β1 and β2 are usually referred to as a transconductance factor.

When μ1=μ2 and Cox1=Cox2, a is determined only according to the gate sizes of the amplification transistor 105 and the constant current-source transistor 121 and is expressed in EQ. (5) below:

[Math. 4]

$$\alpha = \sqrt{\frac{W_2}{L_2} \div \frac{W_1}{L_1}}. \qquad \text{EQ. (5)}$$

Comparison of EQS. (2) and (4) illustrates the following. Only the ground potential of the column amplification circuit 130 decreases and the output variation amount is negative in the case where the source follower circuit 160 and the column amplification circuit 130 do not share a ground node (as in the case of the solid-state imaging device shown in FIG. 5), resulting in a black streak on the sides of a highlight in an output image, or "black streaking". On the other hand, since the source follower circuit 160 and the column amplification circuit 130 share a ground node in the solid-state imaging device according to the first embodiment, the ground potential of the source follower circuit 160 decreases as the ground potential of the column amplification circuit 130 decreases; thus, the output variation is increased in the positive direction, and the "black streaking" is prevented.

When the output variation is increased much enough to make the output variation amount positive, a white streak on the sides of a highlight in an output image, or "white streaking", may be caused. However, regardless of the amplification factor G, the output variation amount is expressed in EQ. (6) below when a is greater than two; thus, the absolute amount of the streaking is reduced.

$$|Vstr2| < |Vstr1| \qquad \text{EQ. (6)}$$

EQ. (7) below may be obtained from EQS. (5) and (6):

[Math. 5]

$$\frac{W_2}{L_2} \div \frac{W_1}{L_1} < 4. \qquad \text{EQ. (7)}$$

The solid-state imaging device according to the first embodiment therefore has a configuration in which streaking is reduced with a design to make the aspect ratio of the gate size of the constant current supply transistor 121 no more than four times of the aspect ratio of the gate size of the amplification transistor 105, in other words, with a design in which a value obtained by dividing the gate width of the constant current-source transistor 121 by the gate length of the constant current supply transistor 121 (gate width/gate length) is no more than four times of a value obtained by dividing the gate width of the constant amplification transistor 105 by the gate length of the amplification transistor 105 (gate width/gate length).

For the solid-state imaging device according to the first embodiment, it is noted that α is expressed as shown below even when μ1 is not equal μ2 and Cox1 is not equal to Cox2.

[Math. 6]

$$\alpha = \sqrt{\frac{\beta_1}{\beta_2}} < 2$$

Specifically, streaking is reduced when EQ. (6) is satisfied with the transconductance factor β1 of the amplification transistor 105 and the transconductance factor β2 of the current-source transistor 121, where β2 is no more than four times of β1. It is very easy for designers to obtain information of μ1, μ2, Cox1, and Cox2; thus, EQ. (6) is still satisfied and streaking is reduced in this configuration.

As described above, the solid-state imaging device according to the first embodiment includes the holding circuits 140 provided for a corresponding one of the pixel columns and the column AD conversion circuits 150 provided downstream of the holding circuits 140. The operation of the amplification and reset of signals from the pixels 100 in the circuitry up to the column amplification circuit 130 and the operation of the AD conversion in the circuitry downstream of the column amplification circuit 130 are simultaneously performed. This reduces the streaking in the output image described above. In addition, the simultaneous operations of the amplification and reset of signals from the pixels 100 in the circuitry up to the column amplification circuit 130 and of the AD conversion in the circuitry downstream of the column amplification circuit 130 increases the frame rate. Furthermore, as the output of the column amplification circuit 130 is read out after the AD conversion for each of the pixel columns, the frame rate and the S/N ratio of the output image are further increased. The solid-state imaging device according to the present variation will show significantly advantageous effects when it is applied to a MOS solid-state imaging device for which a feature of a high frame rate and high quality is provided by priority.

(Variation)

Figure 6:
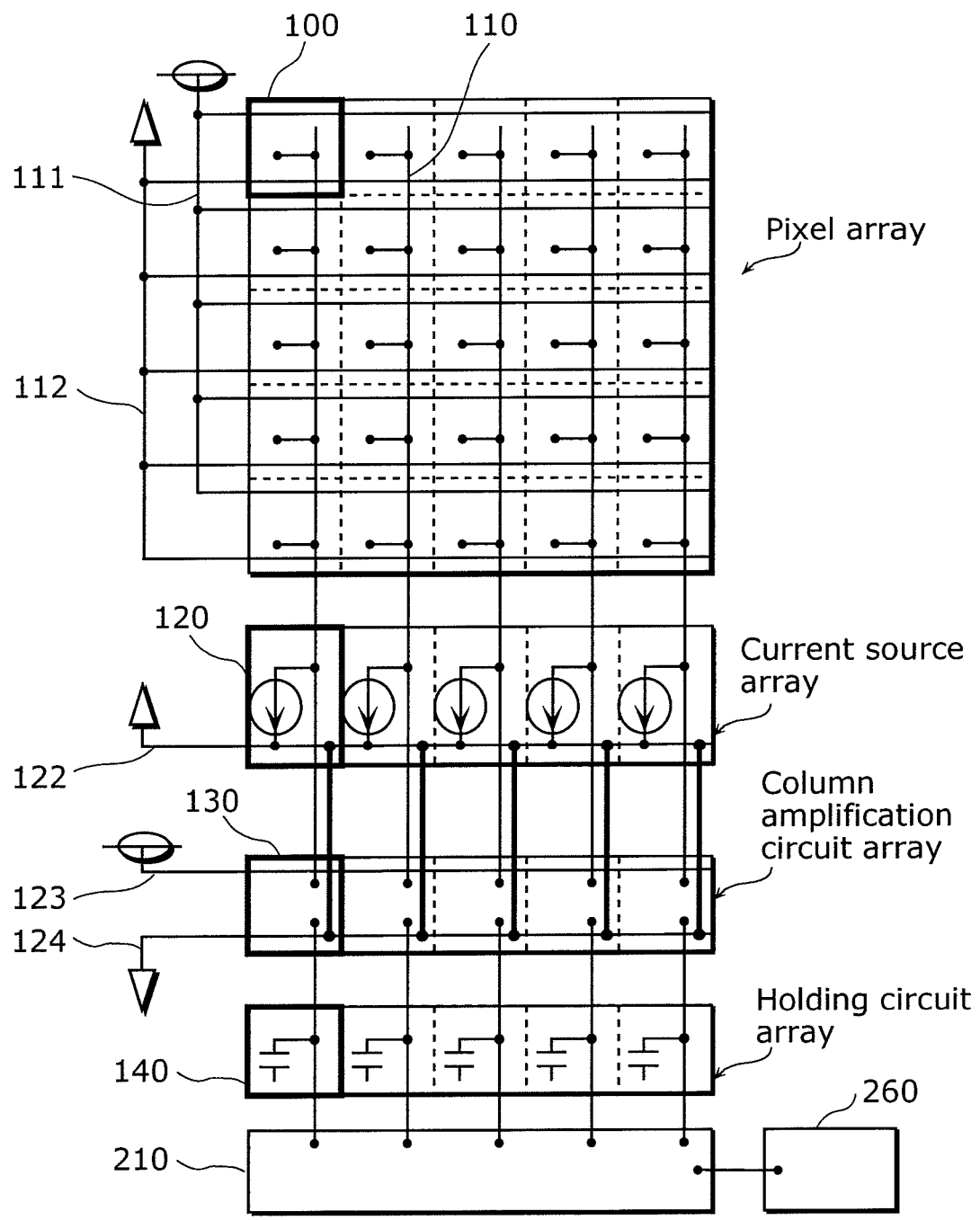
FIG. 6 is a schematic diagram showing an overall configuration of the solid-state imaging device according to a variation of the first embodiment of the present invention.

A variation of the solid-state imaging device according to the first embodiment is hereinafter described. FIG. 6 is a schematic diagram showing an overall configuration of the solid-state imaging device according to the present variation.

As shown in FIG. 6, the solid-state imaging device according to the present variation includes the plurality of pixels 100, the column signal lines 110, the current sources 120, column amplification circuit 130, the pixel power-supply potential supply lines 111, the pixel ground potential supply lines 112, the current-source ground potential supply line 122, the column amplification circuit power-supply potential supply line 123, and the column amplification circuit ground potential supply line 124.

The solid-state imaging device according to the present variation further includes the plurality of column holding circuits 140, a row readout circuit 210 provided commonly for all of the holding circuits 140, and an AD conversion circuit 260 provided downstream of the row readout circuit 210. The row readout circuit 210 subsequently reads out signals held in the holding circuits 140. The AD conversion circuit 260 converts signals read out from the holding circuits 140 into digital signals.

In this case, the current-source ground potential supply line 122 and the column amplification circuit ground potential supply line 124 interconnected at positions each corresponding to a corresponding one of the pixel columns.

Figure 7:
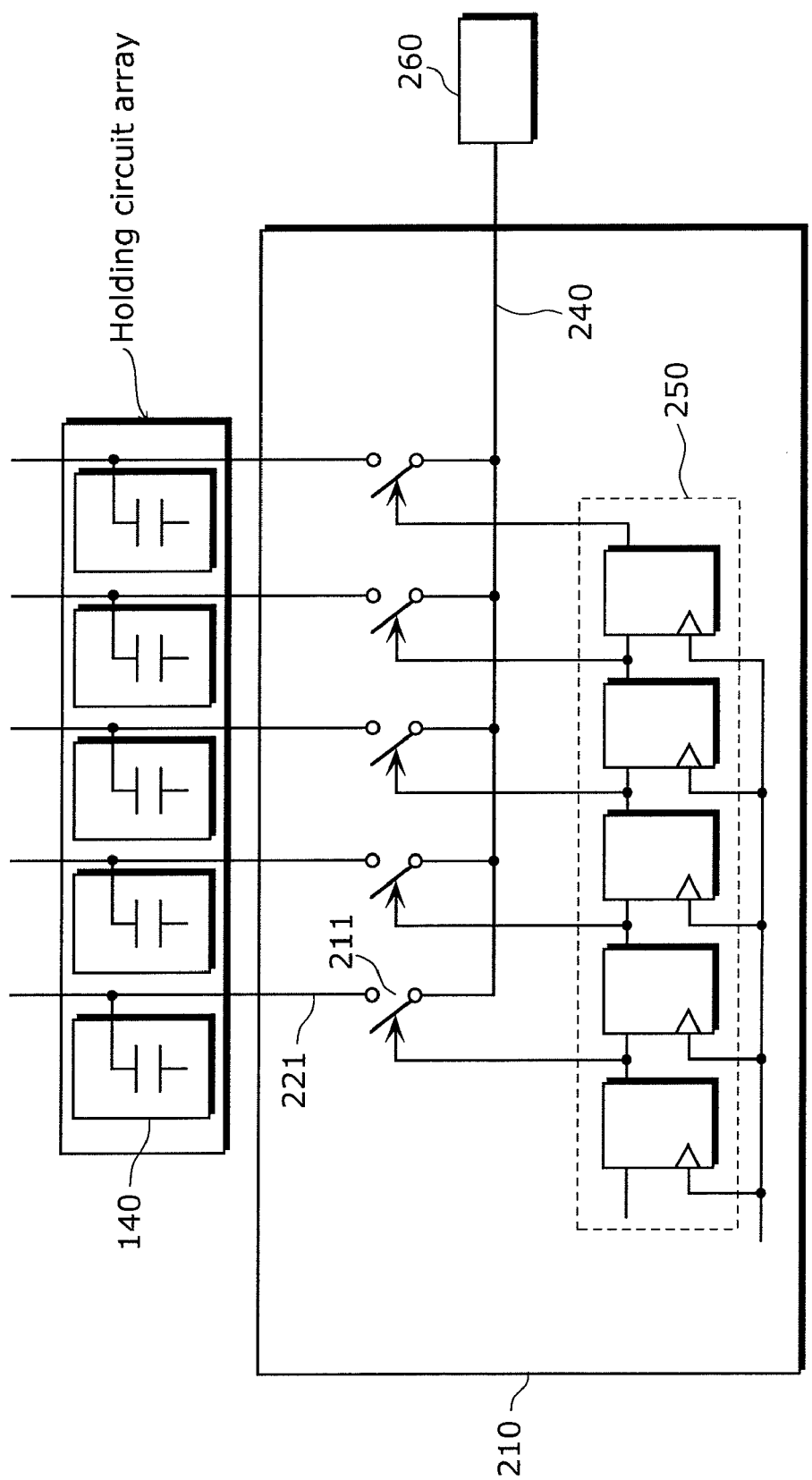
FIG. 7 is a diagram showing a circuit configuration of a row readout circuit provided for the solid-state imaging device according to the variation of the first variation of the present invention in detail.

FIG. 7 is a diagram showing a circuit configuration of the row readout circuit 210 provided for the solid-state imaging device according to the present variation in detail.

The row readout circuit 210 includes input lines 221 which are each provided for a corresponding one of the pixel columns and connect the holding circuits 140 and the row readout circuit 210, row readout switches 211 which are provided for a corresponding one of the input lines 221 and selects from the input lines 221, shift register circuits 250 which are each provided for a corresponding one of the row readout switches 211 and controls the row readout switches 211, and a row readout line 240 which is connected to all the row readout switches 211 and outputs the signals from the holding circuits 140 to downstream circuitry.

In the solid-state imaging device according to the present variation, the row readout switches 211 are controlled by the shift register circuits 250, and the row readout line 240 is provided with signals only from the input lines 221 connected to the row readout switches 211 being on. Accordingly, in the solid-state imaging device according to the present variation, signals from a corresponding one of the holding circuit 140 are subsequently provided for the row readout line 240, and the AD conversion circuit 260 converts the signals to digital signals.

As described above, the solid-state imaging device according to the present variation reads out the analog signals held in the holding circuits 140 as analog signals, and the single AD conversion circuit converts all the signals to digital signals. This reduces the streaking in the output image described above is reduced. In addition, the simultaneous operations up to the column amplification circuit 130 and readout of output signals from the column amplification circuit 130 increases the frame rate. Furthermore, using a single AD conversion circuit 260 increases accuracy of the AD conversion, lowers power consumption by reducing current, and reduces cost by reducing circuit scale. The solid-state imaging device according to the present variation will show significantly advantageous effects when it is applied to a MOS solid-state imaging device for which features of low power consumption, a high frame rate, a high intensity, and a high resolution are provided by priority.

The solid-state imaging device according to the present variation has few limitations on the area for the configuration of the AD conversion circuit 260. Accordingly, accuracy of AD conversion will be increased by, for example, extending the number of bits using a $\Delta\Sigma$ AD conversion circuit or a successive approximation AD conversion circuit.

The AD conversion circuit 260 of the solid-state imaging device according to the present variation may be included not in the solid-state imaging device according to the present variation but in another LSI.

Figure 8:
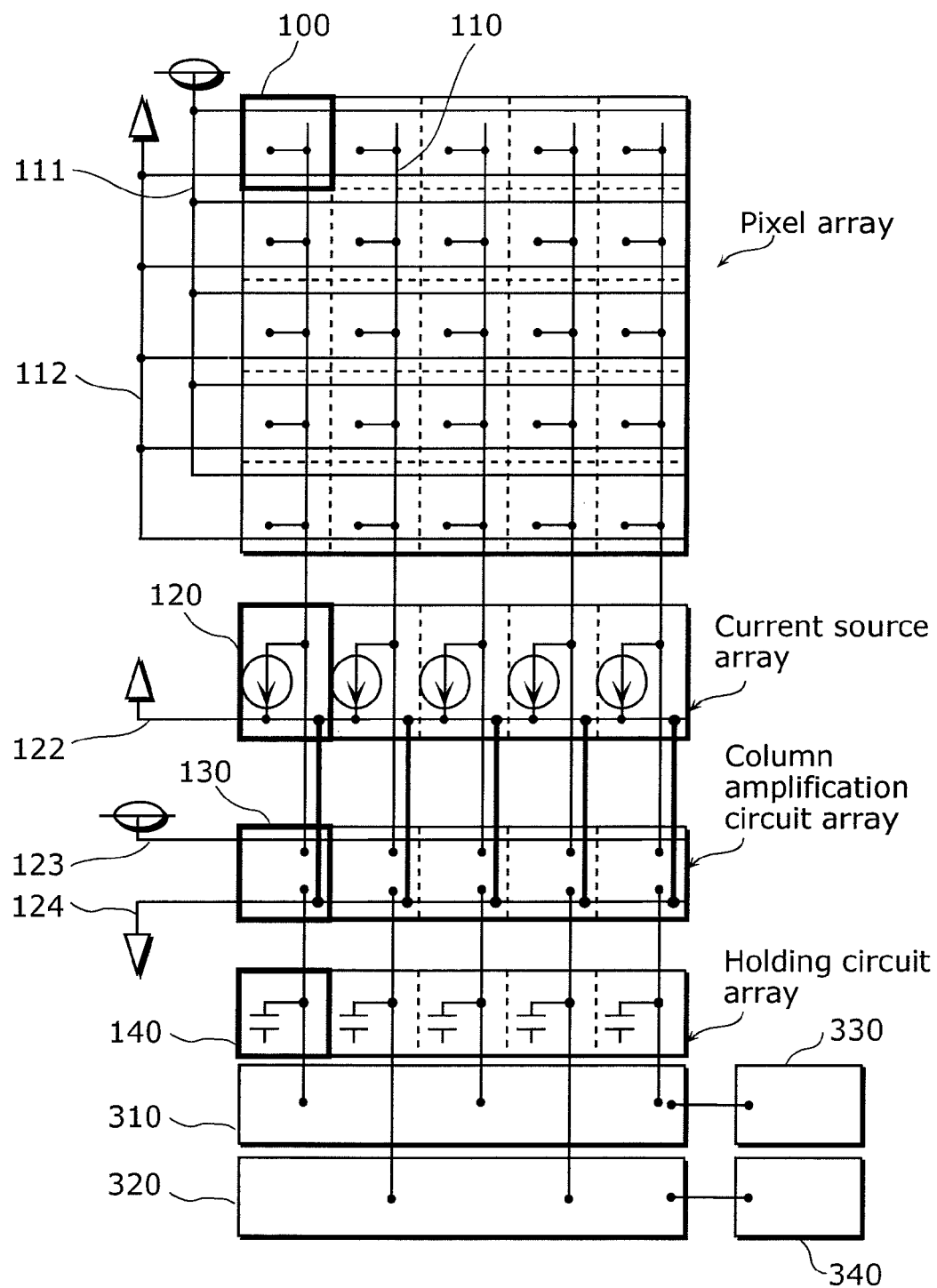
FIG. 8 is a schematic diagram showing another overall configuration of the solid-state imaging device according to the variation of the first embodiment of the present invention.

Furthermore, the solid-state imaging device according to the present variation may have a configuration in which the solid-state imaging device includes a plurality of row readout circuits which read out signals held in the holding circuits and AD conversion circuits which convert the signals readout from the holding circuits. Specifically, as shown in FIG. 8, the solid-state imaging device according to the present variation may have a configuration in which the solid-state imaging device includes a first row readout circuit 310 and a second row readout circuit that are connected to different holding circuits 140, a first AD conversion circuit 330 that is connected to the first row readout circuit 310, and a second AD conversion circuit 340 that is connected to the second row readout circuit 320. This configuration will show an advantageous effect of an increased frame rate of output images.

Figure 9:
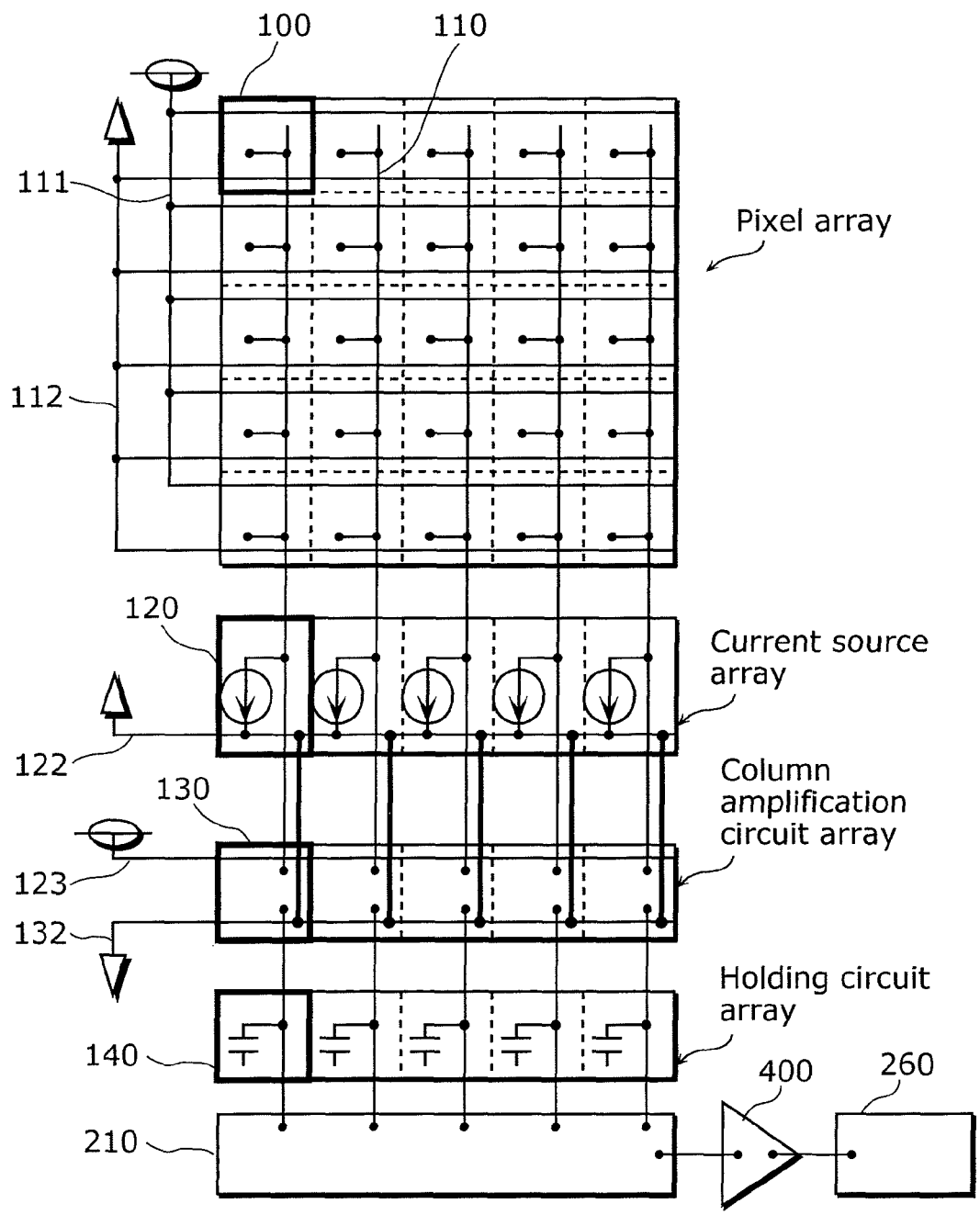
FIG. 9 is a schematic diagram showing another overall configuration of the solid-state imaging device according to the variation of the first embodiment of the present invention.

Furthermore, the solid-state imaging device according to the present variation may have a configuration in which the solid-state imaging device has an amplification circuit between the row circuit and the AD conversion circuit. Specifically, as shown in FIG. 9, the solid-state imaging device according to the present variation may have a configuration in which the solid-state imaging device includes an amplification circuit 400 provided between the row readout circuit 210 and the AD conversion circuit 260. This configuration will show an advantageous effect of an increased S/N ratio of output images.

Second Embodiment

A solid-state imaging device according to the second embodiment of the present invention is described below with reference to figures.

Figure 10:
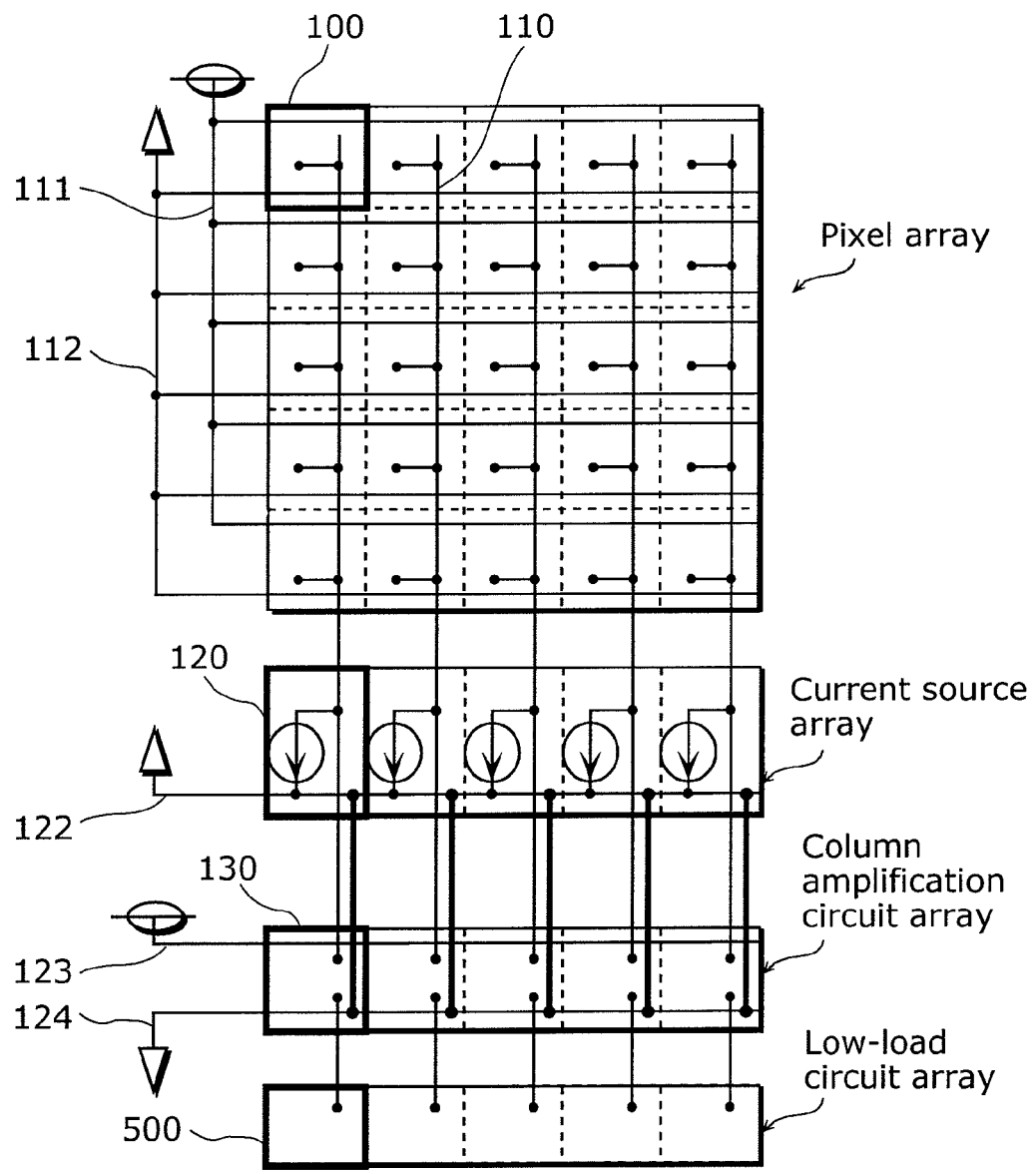
FIG. 10 is a schematic diagram showing an overall configuration of the solid-state imaging device according to the second embodiment of the present invention.

FIG. 10 is a schematic diagram showing a solid-state imaging device according to the second embodiment.

As shown in FIG. 10, the solid-state imaging device according to the second embodiment includes the plurality of pixels 100, the column signal lines 110, the power supplies 120, the column amplification circuits 130, the pixel power-supply potential supply lines 111, the pixel ground potential supply lines 112, the current-source ground potential supply line 122, the column amplification circuit power-supply potential supply line 123, the column amplification circuit ground potential supply line 124, and low-load circuits 500. The low-load circuits 500 are each provided for a corresponding one of the column amplification circuits 130 (or a corresponding one of the column signal lines 110) and are connected to the column amplification circuits 130. The low-load circuits 500 are, for example, circuits that eliminate noises in the signals transmitted from the column amplification circuits 130 and have an input capacitor that has a smaller capacitance value than other capacitors connected to the output lines of the column amplification circuits 130.

In this case, the current-source ground potential supply line 122 and the column amplification circuit ground potential supply line 124 are interconnected at positions each corresponding to a corresponding one of the pixel columns.

Figure 11:
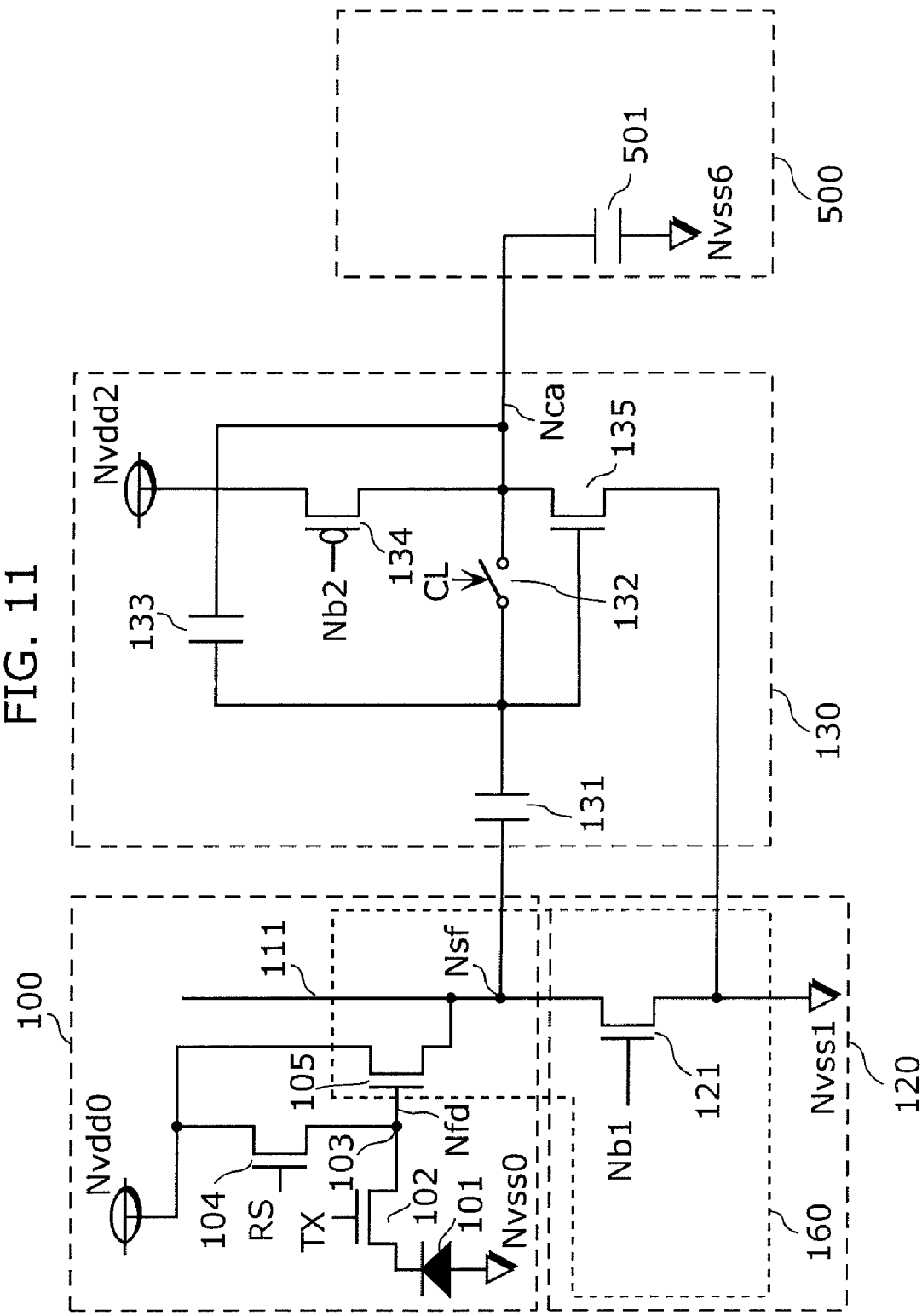
FIG. 11 is a diagram showing a configuration of the solid-state imaging device according to the second embodiment of the present invention in detail.

FIG. 11 is a diagram showing a configuration of the solid-state imaging device according to the second embodiment in detail. Specifically, FIG. 11 is a diagram showing a circuit included in any of the pixels 100 and a circuit that processes a signal from the pixel 100.

The solid-state imaging device according to the second embodiment is configured by replacing the holding circuits 140 and the column AD conversion circuits 150 of the solid-state imaging device shown in FIGS. 1 and 2 with the low-load circuits 500. The low-load circuits 500 each include a capacitor 501 connected to a corresponding one of the column amplification circuits 130.

An operation (a driving method) of the solid-state imaging device according to the second embodiment is hereinafter described with how the streaking in output images (poor imaging) is reduced.

Figure 12:
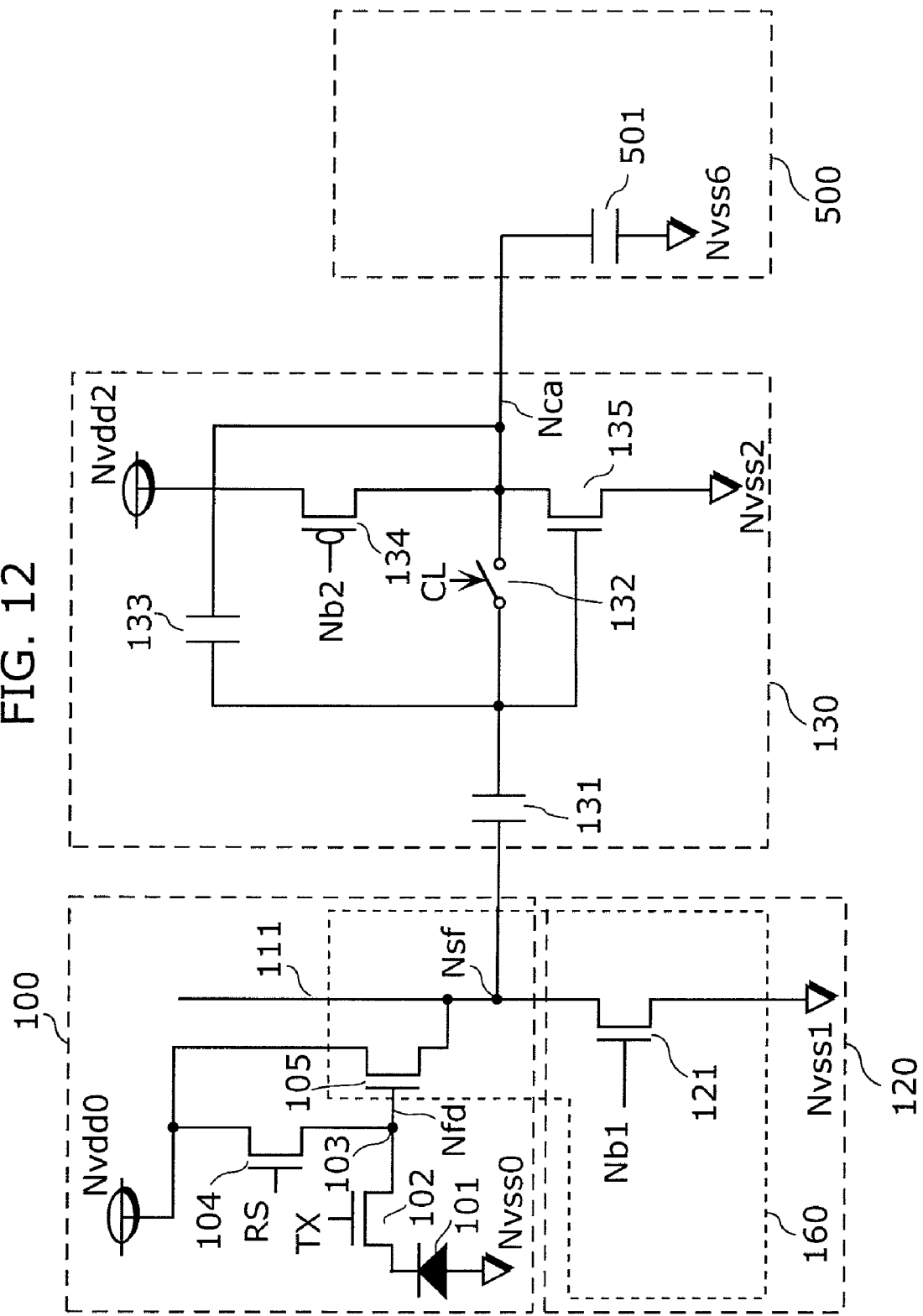
FIG. 12 is a diagram showing a configuration of a conventional solid-state imaging device in detail.

FIG. 12 is a diagram showing a configuration of a conventional solid-state in detail. Specifically, FIG. 12 is a diagram showing a configuration of a solid-state imaging device (a reference device) that is different from the device configuration according to the second embodiment (the device configuration shown in FIGS. 10 and 11) in the point that the current source 120 (the source follower circuit 160) and the column amplification circuit 130 share a ground node.

First, here is a comparison of the amount of streaking between the solid-state imaging device according to the second embodiment and the solid-state imaging device shown in FIG. 12.

A capacitor 501 of the solid-state imaging device shown in FIG. 12 is an input capacitor of the low-load circuit 500 connected to the output node Nca of the column amplification circuit 130 and has a capacitance value smaller than that of the feedback capacitor 133. Accordingly, decrease in the ground potential of the column amplification circuit 130 caused by charging the capacitor 501 is soon suppressed, and $\Delta Vss2$ can be determined as zero; thus the column amplification circuit 130 does not cause streaking. However, in the case where the pixel 100 is receiving a high-intensity incident light, the voltage value Vsf of the column signal line 110 decreases and the current flowing in the source follower circuit 160 decreases, causing the ground potential of the source follower circuit 160 to decrease. When the pixel 100 is receiving no incident light, the voltage value Vsca3 at the output node Nca of the column amplification circuit 130 is expressed in EQ. (8) below, and the output variation amount Vstr3 in EQ. (9) below, where the amount of decrease in the ground potential of the source follower circuit 160 is $\Delta Vss1$.

$$Vsca3 = Vrca + G \times \alpha \times \Delta Vss1 \qquad \text{EQ. (8)}$$

$$Vstr3 = G \times \alpha \times \Delta Vss1 \qquad \text{EQ. (9)}$$

In contrast, for the solid-state imaging device according to the second embodiment, the ground potential of the column amplification circuit 130 decreases by $\Delta Vss1$ when the ground potential of the source follower circuit 160 reduces by $\Delta Vss1$. Thus, the voltage value Vsca4 at the output node Nca of the column amplification circuit 130 is expressed in EQ. (10) below, and the output variation amount Vstr4 in EQ. (11) below when the pixel 100 is receiving no incident light.

$$Vsca1 = Vrca - (1 + G - G \times \alpha) \times \Delta Vss1 \qquad \text{EQ. (10)}$$

$$Vstr4 = -(1 + G - G \times \alpha) \times \Delta Vss1 \qquad \text{EQ. (11)}$$

Here, comparison of EQS. (9) and (11) illustrates the following: Only the ground potential of the source follower circuit 160 decreases and the output variation amount is positive in the case where the source follower circuit 160 and the column amplification circuit 130 do not share a ground node (as in the case of the solid-state imaging device shown in FIG. 13), resulting in a white streak on sides of a highlight in an output image, or "white streaking".

On the other hand, since the source follower circuit 160 and the column amplification circuit 130 share a ground node in the solid-state imaging device according to the second embodiment, the output variation is decreased in the negative direction as the ground potential of the column amplification circuit 130 decreases; thus, the "white streaking" is prevented.

When the output variation is decreased much enough to make the output variation amount negative, a black streak on either side of a highlight in an output image, or "black streaking", may be caused. However, regardless of the amplification factor G, the output variation amount is expressed in EQ. (12) below when $\alpha$ is greater than one; thus, the absolute amount of the streaking is reduced.

$$|Vstr4| < |Vstr3| \qquad \text{EQ. (12)}$$

EQ. (13) below may be obtained from EQS. (5) and (12).

[Math. 7]

$$\frac{W_2}{L_2} \div \frac{W_1}{L_1} > 1 \qquad \text{EQ. (13)}$$

The solid-state imaging device according to the first embodiment therefore has a configuration in which streaking is reduced with a design to make the aspect ratio of the gate size of the constant current supply transistor 121 greater than the aspect ratio of the gate size of the constant amplification transistor 105, in other words, with a design in which a value obtained by dividing the gate width of the constant current-source transistor 121 by the gate length of the constant current supply transistor 121 (gate width/gate length) is greater than a value obtained by dividing the gate width of the constant amplification transistor 105 by the gate length of the constant amplification transistor 105 (gate width/gate length).

For the solid-state imaging device according to the second embodiment, it is very easy for designers to obtain information about µ1, µ2, Cox1, and Cox2 even when µ1 is not equal to µ2 or Cox1 is not equal to Cox2; thus, EQ. (12) is still satisfied and streaking is reduced in the configuration.

Third Embodiment

A solid-state imaging device according to the third embodiment of the present invention is described below with reference to a figure.

Figure 13:
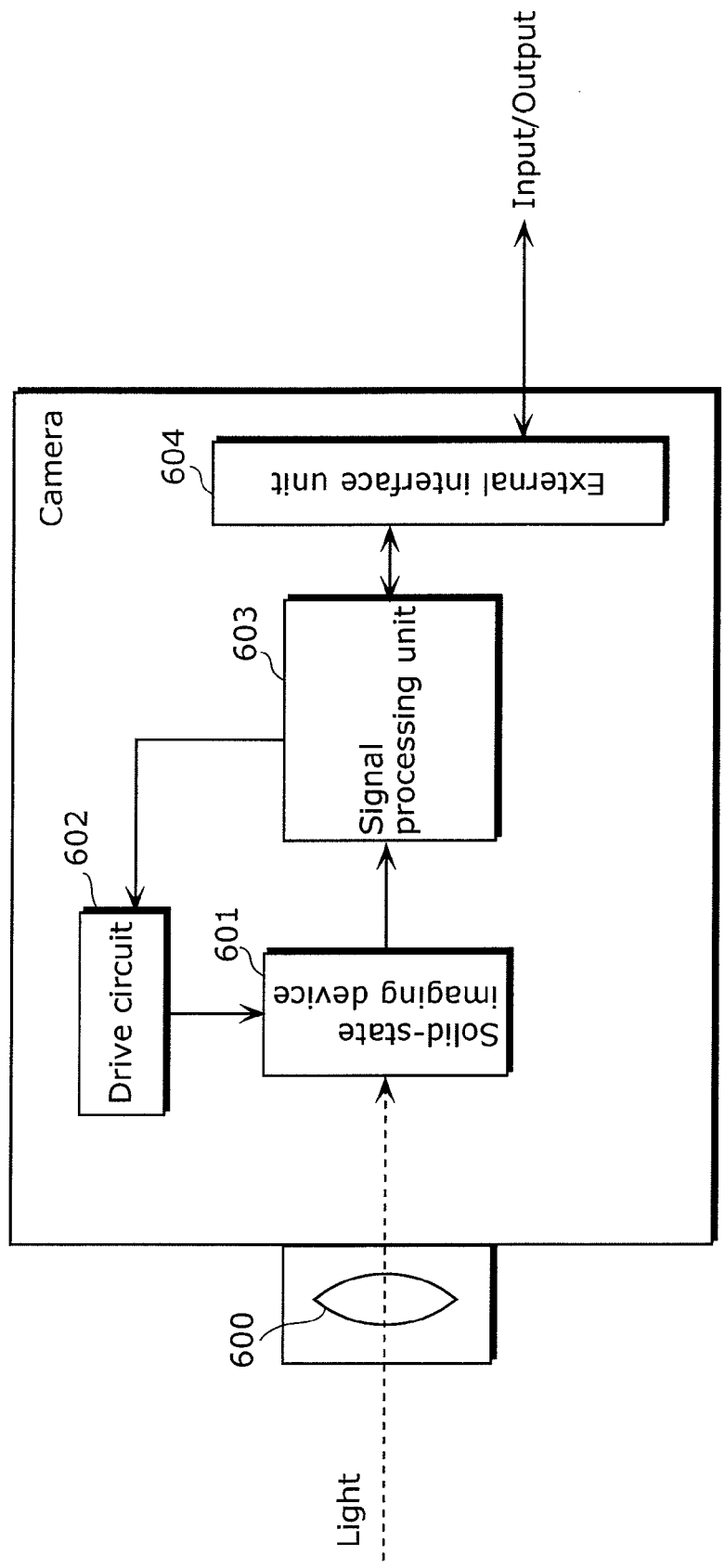
FIG. 13 is a block diagram of a camera according to the third embodiment of the present invention.

FIG. 13 is a block diagram of a camera according to the third embodiment.

The camera includes a lens 600, a solid-state imaging device 601 that is according to the first or the second embodiment, a drive circuit 602, and an external interface unit 604.

The process of outputting a signal from the camera with the configuration above is performed in the procedure described below.

(1) Light passes through the lens 600 to enter the solid-state imaging device 601.
(2) A signal processing unit 603 drives the solid-state imaging device 601 through the drive circuit 602 to receive an output signal from the solid-state imaging device 601.
(3) The signal is processed in the signal processing unit 603, and then outputted through the external interface unit 604.

As described above, in the solid-state imaging device according to the embodiments of present invention, the current-source ground potential supply line 122, which supplies the current source 120 with ground potential, and the column amplification circuit ground potential supply line 124, which provides the column amplification circuit 130 with ground potential, are interconnected at positions each corresponding to a corresponding one of the pixel columns. With this configuration, the ground potential of the column amplification circuit 130 is identical to the ground potential of the current supply 120, which is the ground potential of the source follower circuit 160 that includes the amplification transistor 105 of the pixel 100 and the constant current-source transistor 121 of the current source 120, in a pixel column. The output variation of the column amplification circuit 130 is positive when the ground potential in the amplification period is low in comparison with the ground potential in the reset period in the source follower circuit 160. On the other hand, the output variation of the column amplification circuit 130 is negative when the ground potential in the amplification period is low in comparison with the ground potential in the reset period in the column amplification circuit 130. In contrast, the output variation of the column amplification circuit 130 is negative when the ground potential in the amplification period is high in comparison with the ground potential in the reset period in the column source follower circuit 160. On the other hand, the output variation of the column amplification circuit 130 is positive when the ground potential in the amplification period is high in comparison with the ground potential in the reset period in the column amplification circuit 130. Accordingly, when the source follower circuit 160 and the column amplification circuit 130 are provided with a common ground potential, output variations of the column amplification circuit 130 due to fluctuation in the ground potential are offset, and the streaking in output images is reduced.

Although the solid-state imaging device according to only some exemplary embodiments of the present invention has been described in detail above, those skilled in the art will readily appreciate that many variations are possible in the exemplary embodiments without materially departing from the novel teachings and advantages of this invention. Accordingly, all such variations are intended to be included within the scope of this invention.

For example, the embodiments above are described with an assumption that a pixel has three-transistor (transfer transistor, reset transistor, amplification transistor) architecture, which includes no select transistor. However, the present invention is also applicable to pixels having four-transistor architecture which includes a select transistor (architecture with a transfer transistor, a reset transistor, a amplification transistor, and a select transistor) or three-transistor architecture which does not include a transfer transistor which allows non-destructive readout.

Furthermore, the pixel size may be reduced in the embodiments above by providing adjacent pixels with a common reset transistor or a common amplification transistor to substantially decrease the number of transistors per pixel.

INDUSTRIAL APPLICABILITY

The present invention is applicable to solid-state imaging devices, and especially to MOS solid-state imaging devices.

What is claimed is:

1. A solid-state imaging device that has a plurality of pixels that are arranged in rows and columns and convert optical signals into electric signals to output the electric signals as voltage signals, said solid-state imaging device comprising:
    column signal lines each provided for a corresponding one of the columns of the pixels, said column signal lines transmitting, in a direction of the columns, the voltage signals output from the pixels;
    current sources each provided for and connected to a corresponding one of said column signal lines;
    column amplification circuits each provided for a corresponding one of said column signal lines, said column amplification circuits amplifying the voltage signals transmitted through said column signal lines;
    a first ground line supplying said current sources with ground potential; and
    a second ground line supplying said column amplification circuits with ground potential,
    said first and second ground lines being interconnected, via lines extending along the direction of the columns, at positions each corresponding to a corresponding one of the columns of the pixels,
    wherein the ground potential is supplied to the current sources and the column amplification circuits via the lines extending the direction of the columns.

2. The solid-state imaging device according to claim 1, further comprising
    holding circuits each provided for a corresponding one of said column amplification circuits, said holding circuits temporarily holding the amplified voltage signals output from said column amplification circuits.

3. The solid-state imaging device according to claim 2, further comprising
    column AD conversion circuits each provided for a corresponding one of said holding circuits, said column AD conversion circuits converting the voltage signals held in said holding circuits into digital signals.

4. The solid-state imaging device according to claim 3,
    wherein each of said current sources includes a current-source transistor connected to a corresponding one of said column signal lines, and
    each of the pixels includes:
    a photodiode that converts light into signal charge and accumulates the signal charge,
    a transfer transistor that reads the signal charge accumulated in said photodiode,
    a floating diffusion configured to temporarily accumulate the signal charge transferred from said photodiode,
    a reset transistor that initializes a potential of said floating diffusion, and
    an amplification transistor that outputs a voltage signal according to the potential of said floating diffusion,
    wherein a value obtained by dividing a gate width of said current-source transistor by a gate length of said current-source transistor is smaller than four times of a value obtained by dividing a gate width of said amplification transistor by a gate length of said amplification transistor.

5. The solid-state imaging device according to claim 4,
    wherein each of the pixels further includes a select transistor that selects, from the columns of the pixels, a column from which the voltage signal is to be read out.

6. The solid-state imaging device according to claim 1, further comprising
    low-load circuits each provided for and connected to a corresponding one of said column amplification circuits.

7. The solid-state imaging device according to claim 6,
wherein each of said low-load circuits has an input capacitor that has a smaller input capacitance value than other capacitors connected to output lines of said column amplification circuits.

8. The solid-state imaging device according to claim 7,
wherein each of the pixels includes:
a photodiode that converts light into signal charge and accumulates the signal charge,
a transfer transistor that reads the signal charge accumulated in said photodiode,
a floating diffusion configured to temporarily accumulate the signal charge transferred from said photodiode,
a reset transistor that initializes a potential of said floating diffusion, and
an amplification transistor that outputs a voltage signal according to the potential of said floating diffuser.

9. The solid-state imaging device according to claim 8,
wherein each of said current sources includes a current-source transistor connected to a corresponding one of said column signal lines, and
said current-source transistor has a transconductance factor which is smaller than four times of a transconductance factor of said amplification transistor.

10. The solid-state imaging device according to claim 8,
wherein each of the pixels further includes a select transistor that selects, from the columns of the pixels, a column from which the voltage signal is to be read out.

11. The solid-state imaging device according to claim 1,
wherein each of said current sources includes a current-source transistor connected to a corresponding one of said column signal lines, and
each of the pixels includes:
a photodiode that converts light to signal charge and accumulates the signal charge,
a transfer transistor that reads the signal charge accumulated in said photodiode,
a floating diffusion configured to temporarily accumulate the signal charge transferred from said photodiode,
a reset transistor that initializes a potential of said floating diffusion, and
an amplification transistor that outputs a voltage signal according to the potential of said floating diffusion,
wherein a value obtained by dividing a gate width of said current-source transistor by a gate length of said current-source transistor is no more than four times of a value obtained by dividing a gate width of said amplification transistor by a gate length of said amplification transistor.

12. The solid-state imaging device according to claim 1,
wherein each of the pixels includes:
a photodiode that converts light to signal charge and accumulates the signal charge,
a transfer transistor that reads the signal charge accumulated in said photodiode,
a floating diffusion configured to temporarily accumulate the signal charge transferred from said photodiode,
a reset transistor that initializes a potential of said floating diffusion, and
an amplification transistor that outputs a voltage signal according to the potential of said floating diffusion.

13. A camera comprising said solid-state imaging device according to claim 1.

14. The solid-state imaging device according to claim 1,
wherein the first ground line and the second ground line are interconnected without intervening of the current sources.

15. A solid-state imaging device that has a plurality of pixels that are arranged in rows and columns and convert optical signals into electric signals to output the electric signals as voltage signals, said solid-state imaging device comprising:
column signal lines each provided for a corresponding one of the columns of the pixels, said column signal lines transmitting, in a direction of the columns, the voltage signals output from the pixels;
current sources each provided for and connected to a corresponding one of said column final lines;
column amplification circuits each provided for a corresponding one of said column signal lines, said column amplification circuits amplifying the voltage signals transmitted through said column signal lines;
a first ground line supplying said current sources with ground potential; and
a second ground line supplying said column amplification circuits with ground potential,
said first and second ground lines being interconnected, via lines extending along the direction of the columns, at positions each corresponding to a corresponding one of the columns of the pixels,
wherein the lines interconnecting the first ground lines and the second ground lines are parallel to the column signal lines.

16. A solid-state imaging device that has a plurality of pixels that are arranged in rows and columns and convert optical signals into electric signals to output the electric signals as voltage signals, said solid-state imaging device comprising:
column signal lines each provided for a corresponding one of the columns of the pixels, said column signal lines transmitting, in a direction of the columns, the voltage signals output from the pixels;
current sources each provided for and connected to a corresponding one of said column signal lines;
column amplification circuits each provided for a corresponding one of said column signal lines, said column amplification circuits amplifying the voltage signals transmitted through said column signal lines;
a first ground line supplying said current sources with ground potential; and
a second ground line supplying said column amplification circuits with ground potential,
said first and second ground lines being interconnected, via lines extending along the direction of the columns, at positions each corresponding to a corresponding one of the columns of the pixels, wherein
each of the current sources includes a current-source transistor connected to a corresponding one of the column signal lines,
each of the amplification circuits includes an amplification transistor,
the first ground line and the second ground line are interconnected by connecting a source of the current-source transistor and a source of the amplification transistor provided in each amplification circuit.

* * * * *